United States Patent [19]
Soscia

[11] Patent Number: 6,094,279
[45] Date of Patent: Jul. 25, 2000

[54] SYSTEM AND PROCESS FOR NON-PERCEPTIBLY INTEGRATING SOUND DATA INTO A PRINTED IMAGE

[75] Inventor: Peter P. Soscia, Geneseo, N.Y.

[73] Assignee: Eastman Kodak Company, Rochester, N.Y.

[21] Appl. No.: 08/959,036

[22] Filed: Oct. 28, 1997

[51] Int. Cl.⁷ .................................................. G06F 15/00
[52] U.S. Cl. ........................... 358/1.9; 358/538; 358/452; 355/31; 430/453
[58] Field of Search ............................... 358/1.2, 1.4, 1.9, 358/1.13, 1.15, 298, 504, 528, 538, 539, 452, 453, 451, 450, 448; 355/31, 35; 430/453, 140

[56] References Cited

U.S. PATENT DOCUMENTS

| | | | |
|---|---|---|---|
| 3,835,301 | 9/1974 | Barney | 235/441 |
| 4,075,018 | 2/1978 | Custer | 430/11 |
| 4,178,183 | 12/1979 | Ciurca, Jr. et al. | 430/553 |
| 4,208,210 | 6/1980 | Sakai et al. | 430/140 |
| 4,270,853 | 6/1981 | Hatada et al. | 396/33 |
| 4,855,769 | 8/1989 | Slavitter et al. | 396/210 |
| 4,983,996 | 1/1991 | Kinoshita | 704/231 |
| 5,030,544 | 7/1991 | Olbrechts et al. | 430/140 |
| 5,059,126 | 10/1991 | Kimball | 704/260 |
| 5,313,235 | 5/1994 | Inoue et al. | 360/2 |
| 5,516,590 | 5/1996 | Olmstead et al. | 428/484 |
| 5,528,377 | 6/1996 | Hutcheson | 358/298 |
| 5,532,727 | 7/1996 | Agano et al. | 347/253 |
| 5,547,501 | 8/1996 | Maruyama et al. | 347/107 |
| 5,625,391 | 4/1997 | Hirabayashi et al. | 347/41 |
| 5,644,557 | 7/1997 | Akamine et al. | 369/14 |
| 5,774,752 | 6/1998 | Patton et al. | 396/312 |

Primary Examiner—Edward L. Coles
Assistant Examiner—Mark Wallerson
Attorney, Agent, or Firm—Walter S. Stevens

[57] ABSTRACT

Both a system and process are provided that utilize infra-red dyes to integrate data in a visually non-perceptible form into a printed, color image. The system operates by first selecting the areas of greatest light absorptivities out of the image to record the data, which may be sound information. Next the system determines a target color for each point on the image, as well as the amount of cyan, magenta and yellow coloring agents that must be deposited at each point to attain the desired color. The system then determines the color component additions that the infra-red dye will add to the darker areas when it is over printed thereon. The system subtracts some of the cyan, magenta and yellow coloring agents for each point in the selected areas prior to printing the image so that the target color is attained after the infra-red dye is printed over the selected areas.

18 Claims, 4 Drawing Sheets

SYSTEM AND PROCESS FOR NON-PERCEPTIBLY INTEGRATING SOUND DATA INTO A PRINTED IMAGE

FIELD OF THE INVENTION

Generally speaking, this invention generally relates to systems and methods for integrating sound data into images, and is specifically concerned with the non-perceptible integration of sound data into a printed image.

BACKGROUND OF THE INVENTION

Techniques for integrating sound recordings into still prints are known in the prior art. For example, U.S. Pat. No. 4,270,853 discloses an instant-printing film having a magnetic sound-recording band on one end. The camera that exposes the film has a recording head that sweeps along the band at the time the picture is taken. The camera also includes a play-back head which can reproduce the recorded sound when the recording band is inserted into a slot located in the rear of the camera body. Sound recording systems have also been developed for still cameras using silver halide films which are developed outside of the camera. For example, U.S. Pat. No. 4,983,996 discloses a camera having a microphone which optically records a limited amount of sound data in a bar code pattern along the border of the print. The camera is provided with a detachably connectable bar code reader which is used to scan the code along the print border to play the voice or sound recording associated with the print. Another example of a still camera system capable of recording sound during the taking of a photograph is disclosed in U.S. Pat. No. 5,313,235. In this system, the camera body includes a removable, semiconductor memory component capable of recording sound and voice data at the time the photographs are taken. Additionally, the camera includes a means for generating an optical access code on the individual photographic frames for accessing the sound data on the semiconductor memory.

Unfortunately, each of the aforementioned prior art systems has one or more shortcomings that prevent it from achieving an ideal result. The magnetic recording of sound data on still pictures requires the pictures to be manipulated into contact with a magnetic play-back head. Such a requirement is particularly inconvenient where the still photographs are bound into a photo album or framed for display. Additionally, the use of a separate, non-optical medium that needs to be attached to the film complicates its manufacture. While the use of an optical bar code to record the sound information simplifies the structure of the film forming the print, the amount of information which can be recorded along the narrow border of the photo is quite limited. Moreover, the presence of a bar code along the border of the still image is distracting, and aesthetically unpleasing. While the use of a relatively small optical code in the resulting printed image to access data in a semiconductive memory ameliorates the problems of visual interference and limited audio file size, the physical detachment between the sound data and the photo makes it possible for the sound data to become irretrievably lost if the memory unit is lost or damaged.

Clearly, what is needed is a system and technique for incorporating voice or sound data into a still print with an optically readable medium which avoids the use of "stick-on" magnetic recording materials that require the prints to be inserted into a special play-back apparatus. The system should also avoid the use of visible optical codes along the borders of the image which are limited in capacity, as well as distracting and aesthetically unpleasing. Ideally, such a system should be capable of recording a relatively large amount of sound data directly into the print itself rather than into another, physically separate medium which could easily become lost or destroyed. The sound data should be in a form that is easily and remotely retrievable even when the prints are mounted in an album or frame. Finally, the system should be completely compatible with commercially available image printing devices to obviate the need for the development and manufacture of specialized printing machinery.

SUMMARY OF THE INVENTION

Generally speaking, the invention is both a system and process for integrating data in visually non-perceptible form into a printed image by means of a machine-readable agent, such as an infrared dye, that is characterized by little or no visible light absorptivity. The system comprises an image generator, which may be a thermal matrix dot printer, for generating an image over an array of points by rendering each point to a selected target absorptivity; an image and data file, such as a read-only memory, for providing target absorptivity instructions for each of the array of image points and for rendering the sound data into a two-dimensional pattern, and a central processing unit (CPU) for both selecting a group of the image array points to display the two-dimensional data pattern, and for adjusting the target absorptivity instructions for each of the selected, data-carrying points such that each selected point attains its respective target light absorptivity after the machine readable agent is deposited thereon.

The system is well adapted for integrating data into a color image formed by an array of points of different colors. In such a case, the CPU determines the cyan, magenta, and yellow (C-M-Y) components of color that will be contributed to each of the selected group of data-carrying points when a machine-readable ink is deposited thereon. Next, the CPU determines a target color for each of the array of image points prior to printing the image, and then determines the amount of C-M-Y coloring agents that must be deposited at each of the points of the array to attain the target color. For each of the sound data-carrying points, the CPU subtracts some of one or more of the initially computed amount of C-M-Y agents needed to attain the target color for the point so that the target color is finally attained after the machine-readable agent is printed over these points. While the system is capable of invisibly integrating any type of data into a printed, reflective image, it is particularly well adapted to the integration of sound information into a thermally produced color print which may be conveniently retrieved by, for example, the infrared reader wand disclosed and claimed in co-pending U.S. patent application Ser. No. 08/931,575 filed Sep. 16, 1997, and assigned to the Eastman Kodak Company.

In implementing the process of the invention, the CPU first scans the file deposited in its memory for the presence of audio data. If audio data is detected, the CPU determines the size of the audio file, and converts it into a two-dimensional pattern. It next scans the target color instructions for each of the points or pixels forming the image, and determines those points having maximum light absorptivities. It then proceeds to map the two-dimensional data pattern over the set of points having the highest light absorptivities to insure the invisibility of the audio coding pattern when it is printed over the image. The CPU then determines the C-M-Y components of color that will be added to each of the data-canying points when the data pattern is printed over the image in low-visibility infrared ink. Prior to printing the image, the CPU subtracts the amount of C-M-Y coloring agents deposited on each of the data-carrying points in an amount calculated such that the target color is attained at each point when the machine-readable agent is printed over the subtracted C-M-Y coloring agents.

Both the system and the process of the invention provide a complete record of optically accessible sound information on color prints in a visually imperceptible, non-distracting manner via a process which may be inexpensively implemented by existing, commercially available printing equipment.

DETAILED DESCRIPTION OF THE INVENTION

Figure 1:
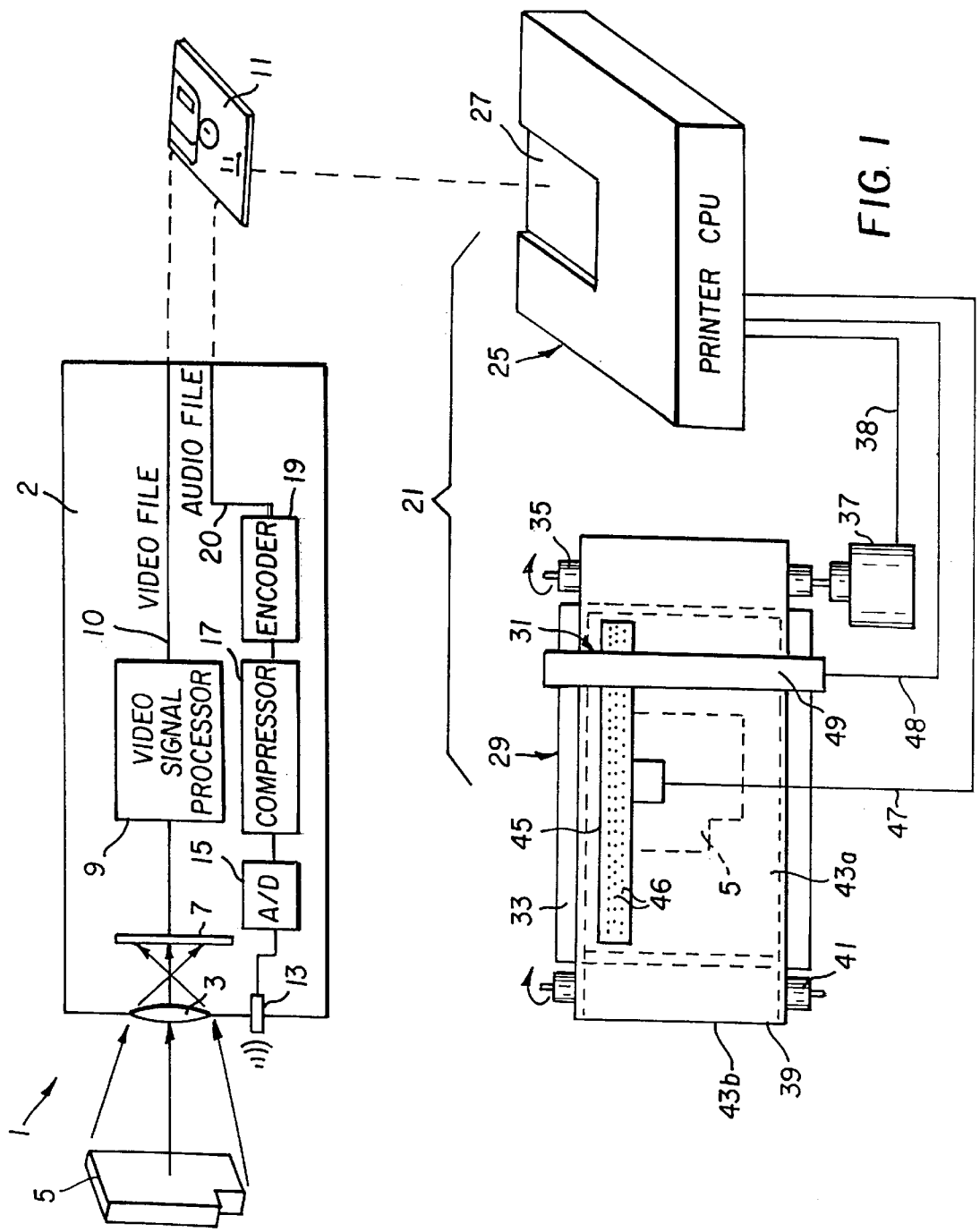
FIG. 1 illustrates, in schematic form, the camera and printer that form the system of the invention.

With reference to FIG. 1, the system 1 of the invention generally comprises a camera 2 having the capacity to generate both an audio and a video file, and a printer 21 that includes a programmable central processing unit (hereinafter CPU).

The camera 2 includes a lens assembly 3 for focusing an image of a subject 5 onto a photodetector array 7. The photodetector array 7 may be any one of a number of well known CMOS, CCD, or other type detectors typically having a resolution capacity of 493×733 pixels. The photodetector array 7 converts the image focused thereon by the lens assembly 3 into electrical impulses which are received by a video signal processor 9. The video signal processor 9 processes the information from the impulses received by the array 7 into a video file 10. Components 2, 3, 7, and 9 are all present within commercially-available digital cameras, such as the Model DC25 camera manufactured and sold by the Eastman Kodak Company located in Rochester, N.Y. Such a camera conveniently processes the image information received from a photodetector array into random access memory (RAM) 11 in any one of a number of formats presently in use, such as the Kodak "Flash Pix" format.

Camera 2 further includes a means for generating an audio file 20. To this end, the camera 2 includes a microphone 13 for converting sound into electrical impulses, an analog digital converter 15 for converting the analog impulses received from the microphone 13 into digital impulses, and an audio compressor 17 that compresses the digitally converted information generated by the converter 15 by a factor of at least 50 to 1 and preferably 100 to 1. Such a high compression ratio allows the system 1 to provide up to ten seconds or more of real time sound information for a relatively small printed image (i.e., 4 by 5 inch). Hence, if the amount of digital information generated by the analog to digital converter 15 amounts to 500 kilobytes, then the audio compressor 17 reduces this data down to 5 kilobytes. Circuits capable of such compression ratios are known in the prior art. While some sound fidelity is lost as a result of such a high compression ratio, the resulting sound quality is still equal to or greater than that generated by a standard dictaphone unit. The compressed data generated by the audio compressor 17 is received by an encoder circuit 19, which converts the compressed data into an audio file 20 compatible with the format used in the video file 10. Preferably, the encoder circuit 19 converts the compressed data received from the compressor 17 into a two-dimensional pattern such as a PDF-417 bar code. Both the video file 10 and the audio file 20 are recorded into a CPU memory unit 11 schematically illustrated as a magnetic disc in FIG. 1.

The printer 21 of the system includes a CPU 25 having a receiver slot 27 for the system memory unit 11. The printer 21 further includes the combination of a ribbon advancing assembly 29 and print head mechanism 31 for printing an image in accordance with instructions from the CPU 25 onto thermal printing paper 33. The ribbon advancing assembly 29 includes a driver roller 35 which in turn is driven by the shaft of an electric motor 37. Motor 37 is controlled by the CPU 25 via cable 38. The drive roller 35 unspools thermal print ribbon 39 from a spool roller 41 over the top surface of the thermal printing paper 33, which in turn is supported by a platen (not shown). The thermal print ribbon 39 includes serially contiguous yellow ink portions, cyan portions, magenta portions, and infrared ink portions 43, each of which substantially covers the upper surface of the thermal printing paper 33 when sequentially advanced over the paper 33 by the drive roller 35 to execute a color printing operation. The print head mechanism 31 operates to deposit the ink on the portions 43 of the print ribbon 30 over the thermal printing paper 33 in superimposed fashion so as to create a colored image. To this end, the mechanism 31 includes a thermal matrix print head 45 having a dense array of very small, spaced apart heating elements 46. The actuation and deactuation of each of the elements 46 is controlled by the CPU 25 via cable 47. The print head 45 is vertically swept over the print ribbon 39 via head sweeping mechanism 49. Head sweeping mechanism 49 is likewise controlled by the CPU 25 via cable 48. In the preferred embodiment, the printer 21 is a model DS8650 thermal printer manufactured by the aforementioned Eastman Kodak Company. Such a printer is capable of depositing 6.5 megabytes of imaging information in a color print 8 by 10 inches in extent, and 1.5 megabytes of information in a 3 by 4 inch print. As will become evident hereinafter, the use of a printer having a high image data capacity is preferable, as it facilitates the invisible integration of sound data into the resulting print by minimizing the area of the print that the optical sound data must be recorded on.

Figure 2:
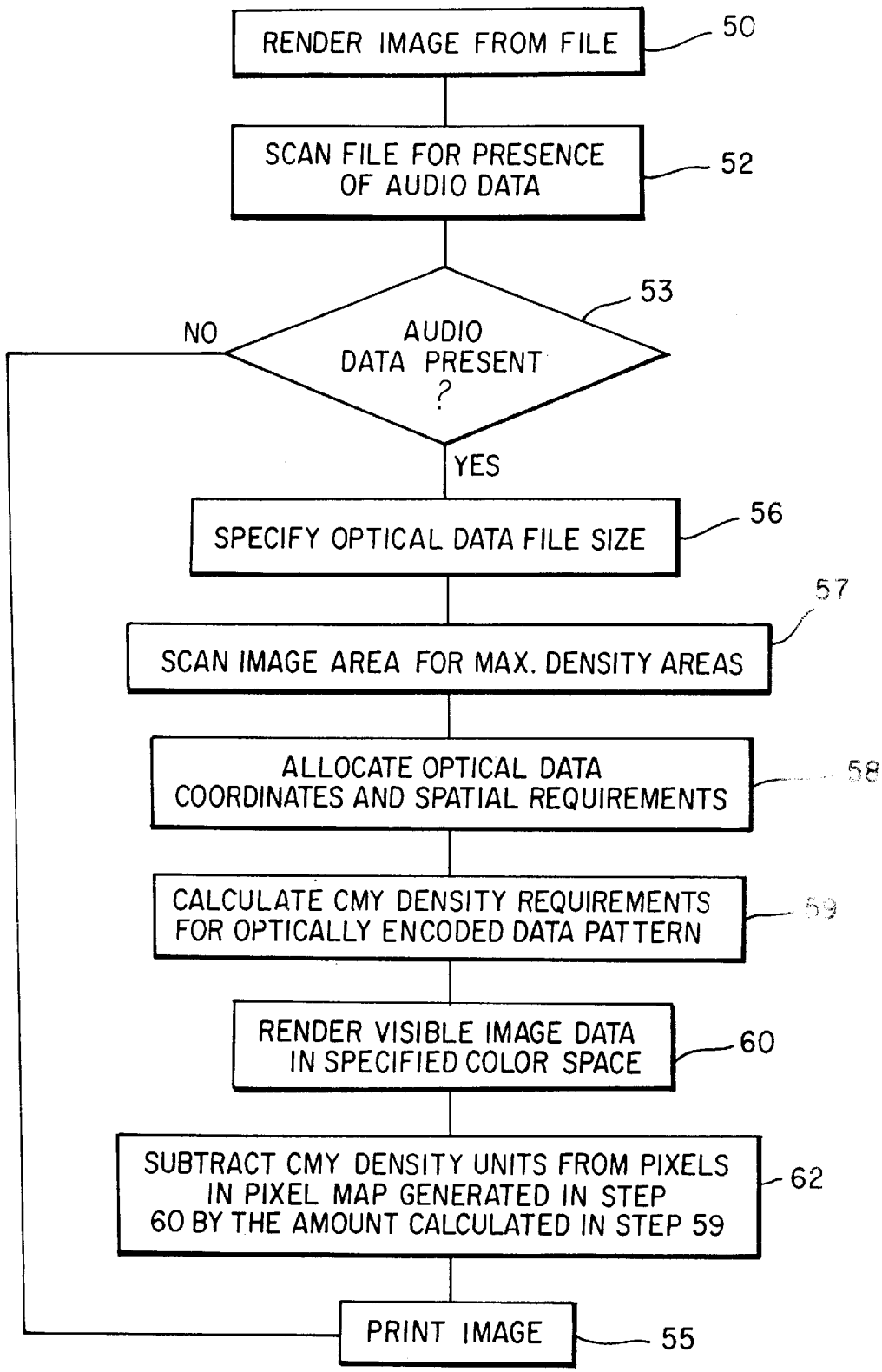
FIG. 2 is a flow chart of the process of the invention that is implemented by the central processing unit of the printer illustrated in FIG. 1.

FIG. 2 illustrates how the CPU 25 implements the process of the invention. In the first step 50 of the process, the CPU 25 withdraws the data file from the memory unit 11 and arranges it into image instructions for the print head mechanism 31. Next, the file information is scanned in step 52 for the presence of audio data. As is indicated in question block 53, if the CPU 25 detects no audio data in the file information, it proceeds directly to step 55, and instructs the print head mechanism 31 to print the image. However, if audio data is detected, it proceeds to step 56 to determine the size of the optical file necessary to record the audio data.

While the maximum size of the audio file is only 5 kilobytes, substantially more area than 5,000 pixels is necessary to render this information into a form that is easily and reliably optically readable by means of, for example, the portable infrared reader described and claimed in the previously-mentioned copending U.S. Ser. No. 08/931,525 filed Sep. 16, 1997. In order to achieve an acceptable signal to noise ratio and the optical redundances necessary to insure a reliable reading operation, when the information in the audio file is converted into, for example, a PDF-417 bar code, an area covering up to 40,000 pixels might be necessary. However, the maximum 40,000 pixel size of the audio file comprises only between about 12.5% to 50% of the 312,000 to 80,250 pixel capacity of the printer 21, depending upon whether the size of the print is as large as 8 by 10 inches, or as small as 4 by 5 inches.

After determining the optical data file size, the CPU 25 proceeds to step 57 and scans the entire image area, prior to printing, for areas of maximum density color (i.e., areas that would print whether colored or not) which would absorb the most light after the image is printed. The CPU 25 does this by assigning each of the pixels a single light-absorbency number based upon the weighted light absorbency of the amount of yellow, cyan, and magenta that will be printed thereon. After each such pixel is so assigned, the CPU 25 proceeds to step 58, and maps the optical data pattern over the image by allocating pixel coordinates first to those pixels having the highest overall light absorbency (which would appear black in the printed image), and secondly to the next darkest appearing pixels and so forth until an optical data pattern representative of the entire audio file has been mapped.

Figure 3A:
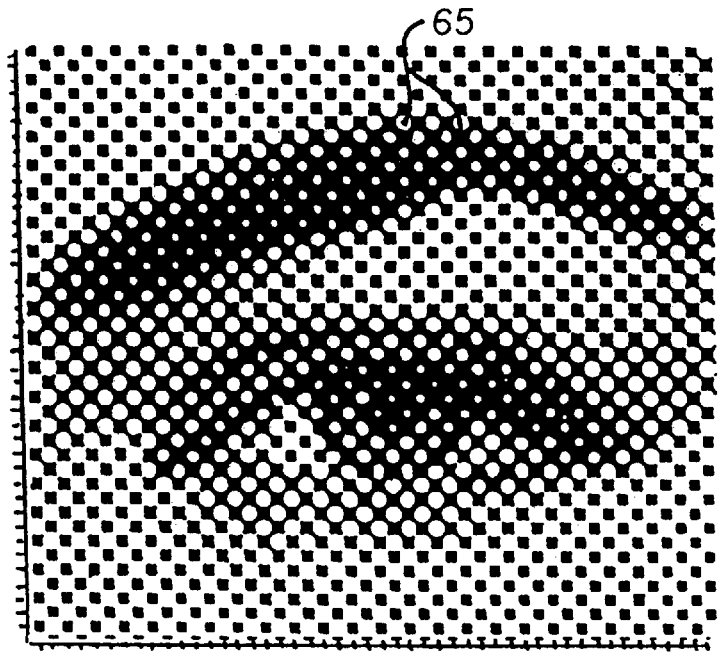
FIGS. 3A and 3B illustrate how the central processing unit of the printer implements steps 57 and 58 of the flow chart of FIG. 2, and FIGS. 4A, 4B, and 4C illustrate how the printer of FIG. 1 implements flow chart steps 59–62 of the inventive process.
Figure 3B:
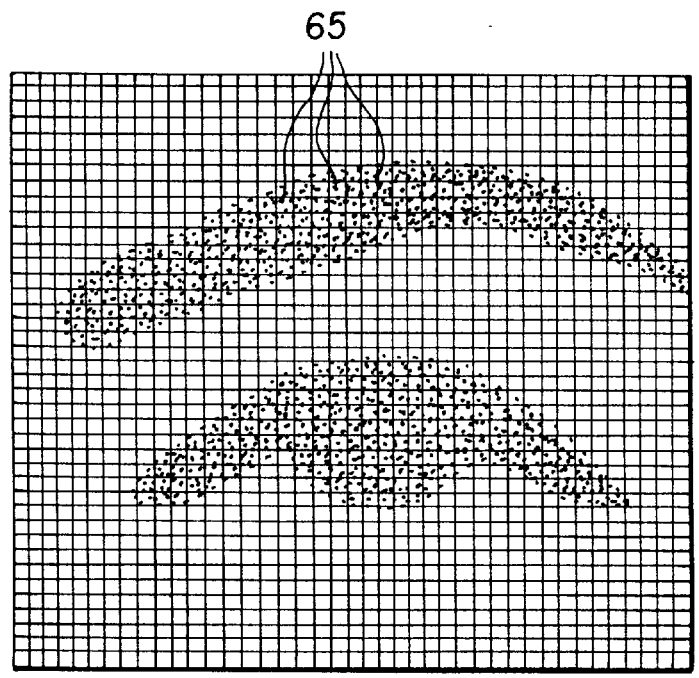

The implementation of scanning step 57 and mapping step 58 is illustrated in FIGS. 3A and 3B. In FIG. 3A, the CPU determines the coordinates of the most light-absorbing pixels 65 in the image (only a small part of which is represented in the Figure). The CPU then maps an optical data pattern over the most light absorbent pixels 65 in FIG. 3B, which in this case corresponds to the eyebrow and shadows surrounding the eye of the subject. While the optical pattern in FIG. 3B is illustrated in shades of black and white, the actual code, if printed against a white background, would only appear as pastel shades. Because the optical representation of the audio file will only cover, in the great majority of cases, a maximum of 50% of the printed image, and since most printed images are comprised of at least 50% of non-white areas, it is usually an easy matter for the CPU 25 to map out the necessary optical code in areas which are many times darker than necessary for the invisible overprinting of infrared dyes. As previously indicated, the optical representation of the bar code may assume the form of a PDF 417 bar code. However, any machine readable format is encompassed within the scope of the invention.

After allocating optical data coordinates for the audio information, the CPU 25 then proceeds to step 59, and computes the C-M-Y density requirements for the optically encoded data pattern. Inks that are highly absorptive in the infrared spectrum often include, as a principal component, an indium and tin mixed oxide. While such inks are largely reflective of visible light, they are not entirely so; many display a light, yellowish green color that is distinctly visible to the naked eye, particularly when printed over a substantially white background. In step 59, the CPU 25 calculates the precise contribution, in terms of both color and overall visible light absorbency, that the infrared ink will make on every one of the selected group of pixels once it is overprinted thereon. Since a yellowish green color may be duplicated by the deposition of yellow and cyan inks, step 59 results in the CPU assigning relatively small cyan and yellow density values to each of the pixels carrying audio data. After completing step 59, the CPU proceeds to step 60, and calculates the C-M-Y densities for all of the pixels in the image file which are necessary to create the image in true color. In other words, the CPU computes the precise number of cyan, magenta, and yellow density units that will have to be deposited onto each of the image pixels in order to obtain the proper "target" color for each pixel. After the CPU 25 completes step 60, it proceeds to step 62, and subtracts the C-M-Y density units computed in step 59 that will be contributed by the overprinting of the yellowish-green infrared ink for each of the pixels 65 selected to record audio data. Once step 62 has been completed, the CPU finally proceeds to step 55 and prints the image.

Figure 4A:
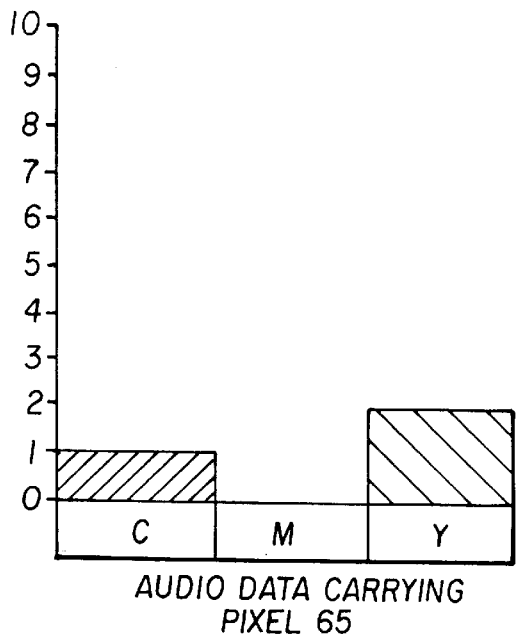
Figure 4B:
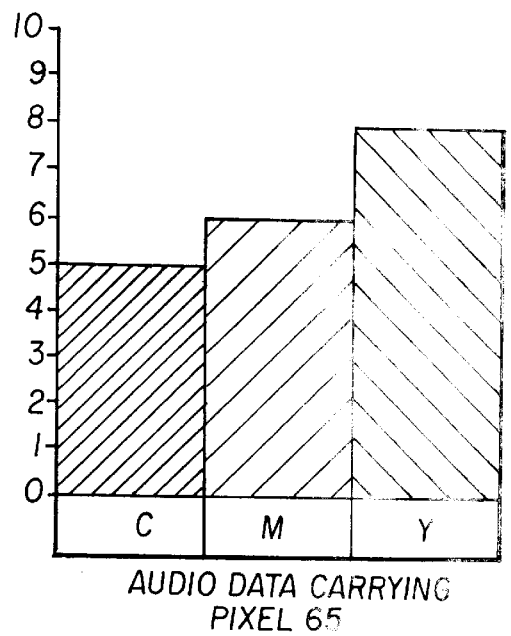
Figure 4C:
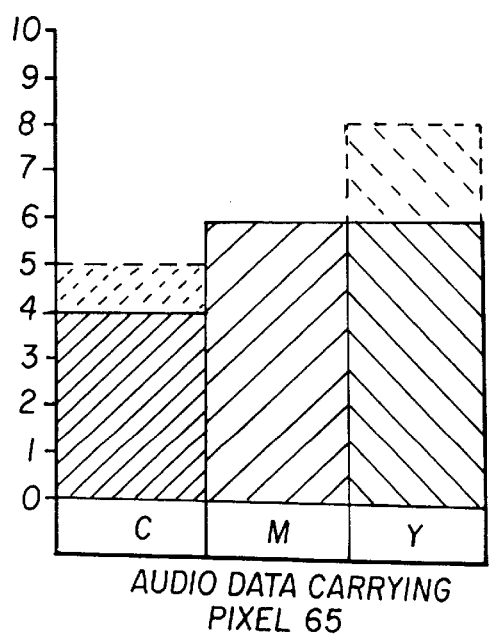

The implementation of steps 59, 60, and 62 on the printing process may best be understood with respect to FIGS. 4A, 4B, and 4C. FIG. 4A illustrates the computer's computation of yellow and cyan density units that the deposition of infrared ink on a particular sound data-carrying pixel 65 will contribute to its overall hue and brightness. For the purposes of this illustration, we will assume that the printer is capable of printing only a maximum of 10 density units per color, wherein the higher the number of density units, the darker the color. As is indicated in FIG. 4A, the CPU has determined that the infrared ink will contribute two density units of yellow, and one density unit of cyan. At the end of step 59, the CPU 25 has determnined these values for all of the audio data-carrying pixels 65. FIG. 4B represents the CPU's determnination of the cyan, magenta, and yellow density units necessary to achieve the image target color for the pixel 65, without any regard for the contribution of yellow and cyan color density units that will be made by the infrared ink. FIG. 4C illustrates the computer's final determnination of the actual amounts of cyan, magenta, and yellow density units that the print head mechanism 31 will actually print over the pixels 65 prior to being overprinted with infrared ink. Here, it can be plainly seen that these final color density units are the same as those computed in step 60 (represented by FIG. 4B) with the density units computed in 59 (represented by FIG. 4A) subtracted out of them so when the infrared ink is printed over the cyan, magenta, and yellow density units computed in step 62, that the target color determined in step 60 will be attained for each of the audio data carrying pixels 65.

While this invention has been described with respect to a preferred embodiment, various modifications and additions to both the system and the process will become evident to persons of skill in the art. All such variations, additions, and modifications are intended to be encompassed within the scope of this invention, which is limited only by the claims appended hereto. For example, the process may be applied to printed black and white images, as well as color, and the step of printing the machine-readable infrared dye may precede as well as follow the printing of the visible coloring agents. Additionally, virtually any type of image printing device may be used to implement the process.

PARTS LIST

1. System
2. Camera
3. Lens
5. Subject
7. Photodetector Array
9. Video Processor
10. Video File
11. System memory—Compact Disc
13. Microphone 15. Analog To Digital Converter
17. Audio Compressor
19. Encoder
20. Audio File
21. Printer
25. CPU
27. Receiver Slot For Memory
29. Ribbon Advancing Assembly
31. Printhead Mechanism
33. Thermal Printing Paper
35. Drive Roller
37. Electric Motor
38. Control Cable
39. Thermal Print Ribbon
41. Spool Roller
43. Yellow Portion, Cyan Portion, Magenta Portion Of Ribbon
45. Thermal Matrix Printhead
46. Heating Elements
47. Control Cable
48. Control Cable
49. Head Sweeping Mechanism
50. Process Step—Render Image From File
52. Process Step—Scan File For Presence Of Audio Data
53. Process Step—Audio Data Present?
55. Process Step—Print Image
56. Process Step—Specify Optical Data File Size
57. Process Step—Scan Image Area For Maximum Density Areas
58. Process Step—Allocate Optical Data Coordinates And Spatial Requirements
59. Process Step—Calculate CMY Density Requirements For Optically Encoded Data Pattern
60. Process Step—Render Visible Image Data In Specified Color Space
62. Process Step—Subtract CMY Density Units From Pixels In Pixel Map Generated In Step 60 By The Amount Calculated in Step 59
65. Audio Data Carrying Pixels

What is claimed is:

1. A process for integrating data in visually non-perceptible form into a reflective image formed by an array of points of different light absorptivities by means of a machine-readable agent having some perceptible amount of light absorptivity, comprising the steps of:

(a) determining a target level of light absorptivity for each of said image points prior to forming said reflective image;

(b) determining an amount of printing agent that must be deposited over each image point to attain said target level of light absorptivity;

(c) selecting a group of said array of points to form an optical code;

(d) redetermining said amount of printing agent for each of said array of points by subtracting some or all of the first determined amount of printing agent for each selected point such that said target level of light absorptivity will be attained when said machine-readable agent is deposited onto each selected point;

(e) depositing a printing agent over said array of points to form said reflective image, and (f) depositing said machine-readable agent onto a selected group of said array of points to form an optical code representative of said data that is machine readable but visually imperceptible.

2. The process of integrating data in visually non-perceptible form as defined in claim 1, wherein step (f) is performed prior to step (e) such that said machine-readable agent is deposited under said printing agent at each of said selected group of points.

3. The process of integrating data in visually non-perceptible form as defined in claim 1, wherein said image is formed from points of lower light absorptivity and higher light absorptivity, and said group of data-recording points is selected from image points of higher absorptivity to render said machine-readable agent imperceptible.

4. The process of integrating data in visually non-perceptible form as defined in claim 1, wherein said image is formed by an array of points of different colors, and wherein step (a) is implemented by depositing printing agents of different colors at each of said points, and wherein said machine-readable agent is characterized by a color.

5. The process of integrating data in visually non-perceptible form as defined in claim 4, further comprising the step of determining a target color for each of said image points prior to forming said reflective image.

6. The process of integrating data in visually non-perceptible form as defined in claim 5, further comprising the step of subtracting one or more of said coloring agents for each one of said selected group of points prior to step (a) such that said target color is attained after said machine-readable agent is deposited onto each of said selected points.

7. The process of integrating data in visually non-perceptible form as defined in claim 1, wherein said data is sound information.

8. The process of integrating data in visually non-perceptible form as defined in claim 7, wherein said data is representative of compressed, self-clocking sound information.

9. A process for integrating data in visually non-perceptible form into a printed, reflective image formed by an array of points of different absorptivities by means of a machine-readable agent that is characterized by a low level of visible light absorptivity, comprising the steps of:

(a) selecting a group of said points to record said data;

(b) determining a target absorptivity for each of said points of said array prior to printing said image;

(c) determining the amount of different coloring agents that must be deposited at each of said points of said array to attain said target absorptivity for each point;

(d) subtracting some or all of one or more of said coloring agents for each of said selected points prior to printing said image such that said target absorptivity for each selected point is attained after said machine-readable agent is printed onto said selected points, and (e) printing said image by depositing said coloring agents at all of said points of said array and depositing said machine-readable agent at each of said selected points.

10. The process for integrating data in visually non-perceptible form as defined in claim 9, wherein said image is formed from points of different overall light absorptivities, and wherein said group of data-recording points is selected from points having the highest visible light absorptivities.

11. The process for integrating data in visually non-perceptible form as defined in claim 9, wherein said selected points form no more than about 50% of all of said points of said image.

12. The process for integrating data in visually non-perceptible form as defined in claim 9, wherein said machine-readable agent includes infrared dye.

13. The process for integrating data in visually non-perceptible form as defined in claim 9, wherein said group of selected points forms a two-dimensional data array.

14. The process for integrating data in visually non-perceptible form as defined in claim 9, wherein said data is representative of sound data compressed by a factor of at least 50 to 1 that includes self-clocking information.

15. The process for integrating data in visually non-perceptible form as defined in claim 9, wherein said points are pixels, and said coloring agents are thermally deposited yellow cyan, and magenta agents.

16. A system for integrating data in visually non-perceptible form into an image by means of a machine-readable agent having a low level of visible light absorptivity, comprising:

an image generator for generating an image over an array of points by rendering each point to a target absorptivity;

image and data file for providing target absorptivity instructions to said image generator for each of said array of points to create said image and for rendering said data into a two-dimensional pattern superimposed over a selected group of said points, and a central processing means for adjusting the target absorptivity instructions for points selected to represent said two-dimensional pattern such that each selected point attains its respective target absorptivity after both a printing agent and said machine-readable agent is deposited thereon.

17. The system for integrating data in visually imperceptible form as defined in claim 16, wherein said image generator is a thermal matrix dot printer, and said image and data file is a system memory, and said processing unit forms part of said printer.

18. The system for integrating data in visually imperceptible form as defined in claim 17, wherein said central processing unit selects group of points from said array of points having the highest absorptivity target instructions to represent said two-dimensional data pattern.

* * * * *